United States Patent [19]

Kito

[11] 4,068,950
[45] Jan. 17, 1978

[54] VARIABLE PLATEN COVER

[75] Inventor: Hidetoshi Kito, Ebina, Japan

[73] Assignee: Rank Xerox Ltd., London, England

[21] Appl. No.: 698,664

[22] Filed: June 22, 1976

[30] Foreign Application Priority Data

Oct. 15, 1975 Japan .......................... 50-139462[U]

[51] Int. Cl.² .............................................. G03B 27/62
[52] U.S. Cl. .......................................... 355/75; 355/8; 355/77
[58] Field of Search .................................. 355/75–77, 355/25, 7, 8

[56] References Cited

U.S. PATENT DOCUMENTS

| | | | |
|---|---|---|---|
| 3,486,819 | 12/1969 | DiGuilio | 355/8 X |
| 3,606,534 | 9/1971 | Alman et al. | 355/8 |
| 3,609,032 | 9/1971 | Watanabe et al. | 355/75 X |

Primary Examiner—Richard L. Moses

[57] ABSTRACT

In an electrophotographic copying machine of the type in which an original copying platen is mounted at one side of the body of the copying machine with a corner of the platen at the exterior side of the platen adapted for book copying, and in which the scanning starting point of a document exposure lamp which scans the entire platen is from the side of the platen opposite from the corner of the platen, there is disclosed a platen repositionable by movement toward the scanning direction of the exposure lamp to shorten the exposed or scanned area of the platen and to move the edge of a book page on the platen to the copier registration position for copying of the book page onto a smaller copy sheet corresponding in size to the book page rather than the platen size.

16 Claims, 7 Drawing Figures

VARIABLE PLATEN COVER

The present invention relates to an electrophotographic copying machine suitable for copying different sizes of, and particularly suitable for thick multi-page originals such as bound books.

Where thick originals such as books are copied, copying may be accomplished by pressing the sheet or page to be copied against a platen. However, as shown in FIG. 2, portions of the sheet close to the binding area become levitated from the platen. Consequently, the characters and figures in those portions are displaced or out of focus on the photosensitive drum (and therefor on the copy sheet) resulting in dissatisfactory copying. Thus, there has also been known a copying structure wherein, as shown in FIGS. 1 and 2, the original support or rest (referred to herein as a platen) 2 is mounted on one side of a copying machine body 1, a corner portion 3 of the platen 2 is formed at an end exteriorly of the platen 2, and a scan-starting point of an exposure lamp 4 is set at the side opposite the corner portion 3 of the platen 2, whereby the bound part of a book is held to the corner portion 3 of the platen 2 so that the entire surface of one page may securely be placed in intimate contact (flatly) on the surface of the platen 2. This is sometimes referred to a "corner edge" book copying capability. An example of such a system is disclosed in U.S. Pat. No. 3,775,008, issued Nov. 27, 1973, to R. A. Schaeffer, et al. and in the Xerox Corporation "4000" and "4500" copiers.

Referring to FIG. 1, in the operation of the prior art copying machines described above an original A on the platen 2 is irradiated by the light strip emitted from the exposure lamp 4, which is moved from right to left in FIGS. 1 and 2 to obtain the reflective light strip image 5 containing the characters, figures and the like of the original A. The reflective light 5 passes through a lens 6 and irradiates a photosensitive member 9 by means of reflective mirrors 7 and 8 to form an electrostatic latent image in a known manner. This electrostatic latent image is applied with toner and formed into a visual image by means of a known developing device 10, for example, a two-component system cascade developing device or a magnetic brush developing device or the like as the photosensitive member 9 rotates. The toner image moves to a transfer position as the photosensitive member 9 rotates. At this time, a sheet of paper is fed from a paper tray 11 in timed relation to the movement of the photosensitive member 9 in registration with the previously formed toner image on the photosensitive member 9, and the back of the sheet is subjected to a corona discharge in a known manner, for example, by a corona discharger 12 in the transfer position, from which the toner image is transferred onto the sheet from the photosensitive member 9. Thereafter, the sheet is disengaged from the photosensitive member 9 and the image is then fixed by a fixing device 13 and discharged into a discharged paper receiving tray 14.

The copying machine shown in FIG. 1 suffers from the above-described drawbacks illustrated in FIGS. 2 and 3. These figures show the two different ways of copying a thick or imperfectly (edge area) bound book on the platen 2. If an original A, which is a thick book, is placed on a platen 2 with the bound part B of the original registered with the corner 3 of the platen as in FIG. 2, the entire page of the original may be satisfactorily copied without image displacement; however, when the thick book original A is small in page size, a sheet of copy paper of the same size as that of the entire platen 2 [in the scanning direction] must be used even though the original A page is smaller than either.

For example, when a thick book whose page is Japanese A4-format in size is copied on a platen 2 which is Japanese B4-format in size, the book must be copied as in FIG. 2 by using a sheet of copy paper whose size is B4-format, i.e., much larger. This is because of the fact that the exposure lamp 4 starts moving from the side opposite to the corner portion 3 of the platen 2 toward the corner portion 3, and that defines the registration (lead) edge of the copy sheet in the copier.

As shown in FIG. 3, if the thick book original A is alternatively placed in position on the platen where the edge of the original A is registered with the starting position of the exposure lamp 4, then a portion of the original A close to the bound portion B will be levitated from the platen 2, as shown. As a consequence, a focal point will not be formed on the photosensitive drum 9 for that portion of the original.

Thus, in case the entire page of a book or the like must be copied in such a system, a sheet of paper of the same size as that of the platen must be used irrespective of the size of the original, which is not economical.

It is known to provide an operator with a selector for selecting different lengths of scan of a platen (i.e., changing the start of the scan return or "fly-back" point) for different original document lengths. For example, the systems disclosed in the Xerox "1000" copier and in U.S. Pat. No. 3,090,616, issued May 21, 1963, to R. W. Eichler et al. [note especially Col. 14, last paragraph, Col. 15, next to last paragraph, and Col. 22]. However, changing the end-of-scan position will not solve the above-stated problem.

The present invention has been realized in view of the above, and it is an object of the invention to provide an electrophotographic copying machine wherein the effective area of a platen may be changed and adjusted so that when an original is copied, a sheet of copy paper having the same size as the original may be used.

The features and advantages of the invention will be more fully understood by reference to the following detailed description of one exemplary embodiment thereof, and to the following figures illustrating this embodiment, wherein:

FIG. 1 schematically illustrates a conventional prior art electrophotographic copying machine;

Figure 1:
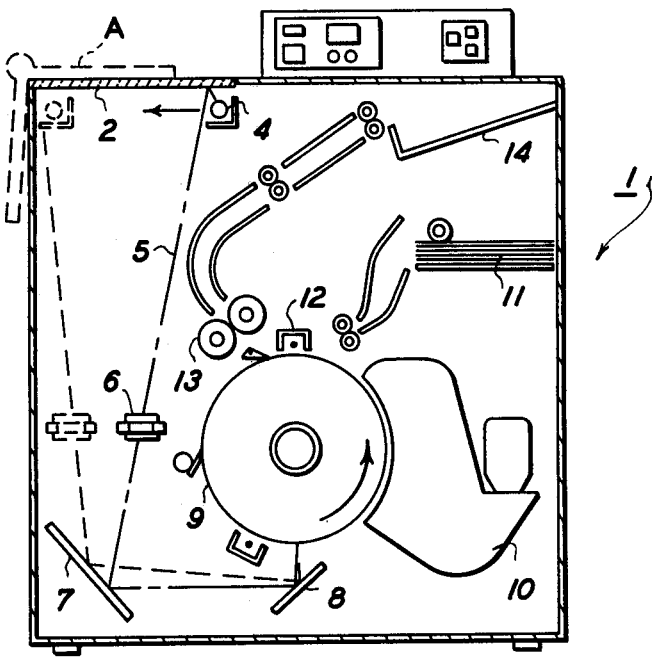
Figure 2:
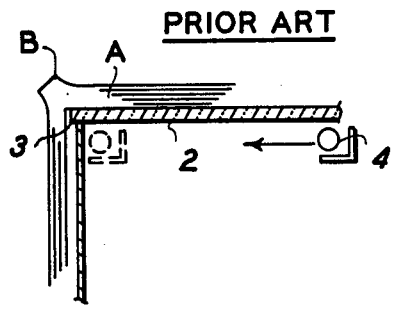
FIGS. 2 and 3 are enlarged portions of FIG. 1 illustrating positions of an original book placed on a platen of the copying machine of FIG. 1.

An embodiment of the present invention will now be described with reference to FIGS. 4–7.

A body 21 of the copying machine has an opening portion 22 formed to one side of an upper surface thereof to receive therein a platen 23. The platen 23 is a transparent plate provided with a corner portion 24, and has opposite ends, on which are mounted a pair of left and right end rollers 26 rolling on rails 25 mounted at the sides of the body 21 (note FIG. 4).

An exposure lamp 27, which reciprocates along the undersurface of the platen 23, is fixedly mounted on belts 28 on both sides of the body 21. When the pair of belts 28 are moved in the forward and reverse direction, the exposure lamp 27 reciprocates to and from the corner portion 24 for scanning.

Figure 5:
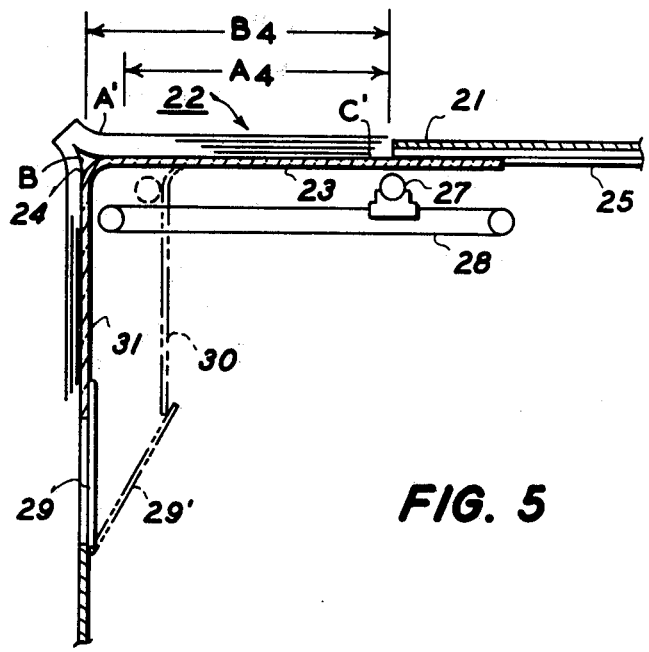
FIG. 5 is a sectional view taken along the line 5—5 of FIG. 4.
Figure 6:
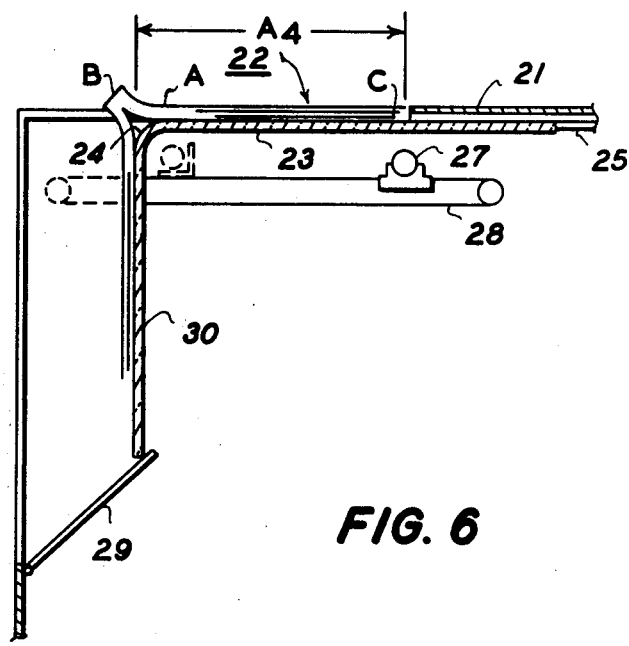
FIG. 6 is a sectional view like FIG. 5 showing a different portion of the platen in operation.

In FIGS. 5 and 6, a shield plate 29, which is mounted on the body 21, is rotatably retained by means of a spring or the like so that it may be maintained in contact with the side of the platen 23 (note the alternate dashed line position 29' in FIG. 5).

The copying machine is operated in the following manner. As shown in FIG. 5 and 6, in the case where a thick original A of A4-format is to be copied, as in FIG. 6, the platen 23 is first moved into a position of A4-format, as indicated by position 30. This movement of the platen 23 is along the rails 25 on the rollers 26. The platen 23 which had been a B4-format, as shown in FIG. 5, is thereby formed into an A4-format, as shown in FIG. 6. In this condition, as shown in FIG. 6, when the original A is placed so that the bound portion B is registered with the corner portion 24 the end C of the original A is registered with the position in which the exposure lamp 27 starts its movement.

Then, a copy button is depressed to start moving the exposure lamp 27 and to stop its movement at a position of A4-format, and then returning it to its initial position, whereby the entire page of the original A may be copied using a sheet of paper having a size of A4-format.

In the case of an original A' of B4-format being copied, as in FIG. 5, it will be appreciated that the platen 23 may be moved out to a position where it is registered with a document edge C' of B4-format, as indicated by platen position 31 in FIG. 5, to provide a clear copy of the entire original in a manner similar to the above case.

Figure 7:
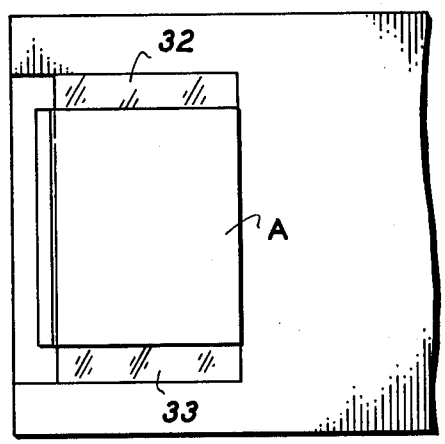
FIG. 7 is a simplified plan view like FIG. 4, with an original on the platen.
Figure 3:
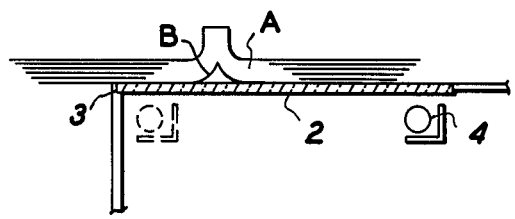
Figure 4:
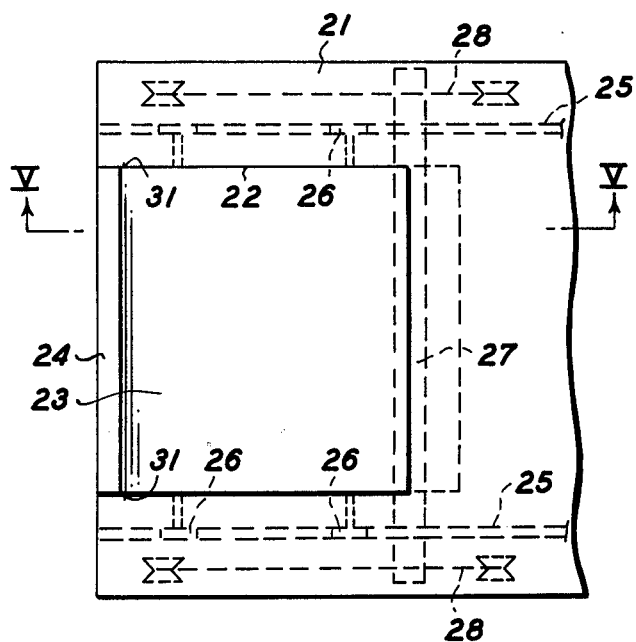
FIG. 4 is a plan view showing an embodiment of the present invention.

The portions of the platen 23 which is not covered by the original when the book is copies does not reflect the light of the exposure lamp 27 from the original, and therefore, a black wide region could be developed on the sheet of paper in those portions. This would mean a consumption of a larger amount of toner, resulting in a rise in the cost of copying. However, if the platen 23 is moved according to the size of the original as in the disclosed system, then such an otherwise large black region developed on the copy sheet is reduced or eliminated, to decrease the consumption of toner and the copying cost. It will be noted that, as shown in FIG. 7, toner otherwise adhered to edge regions 32 and 33 will not appear on the copy sheet where a smaller copy sheet can be used corresponding to the original, and therefore, this toner will remain on the photoreceptor drum and will be carried to a cleaning device for being recovered as the photosensitive member rotates.

While the apparatus has been described with respect to the Japanese A4-format and B4-format above, it is to be understood that these are merely examples of two different sizes and the copy sheet sizes are not limited thereto or critical.

With the construction of the present invention as described above, the platen 23 may be moved according to the size of any original so that the effective edge of the platen can be registered with the edge of that original. Accordingly, when the original is copied, a sheet of paper having the same size as that of the original may be used to copy the entire original.

It will be appreciated that with a variable magnification reduction copier that the copy sheet may be even smaller than the original, by the reduction ratio, with the disclosed system.

It will also be appreciated that the present system could be utilized in a copier in which the scanning exposure means is a moving mirror or mirrors below the platen as is well known, rather than, or in addition to, the scanning illumination lamp.

While the scanning distance of the optical scanning system here can be proportionally shortened with the reposition of the platen by the vertical wall of the platen automatically limiting the available scanning distance, it will be appreciated that in a copier having a different scanning system or end wall configuration the scanning optics could be allowed to continue out beyond the corner edge of the platen, and therefor to have the same scanning distance regardless of the repositioning of the platen on the copier frame.

Various advantages and applications, in addition to those described above, will be apparent to those skilled in the art from the above-described apparatus details and method steps. While the embodiment disclosed herein is generally considered to be preferred, numerous variations and modifications will be apparent to those skilled in the art. The following claims are intended to cover all such variations and modifications as fall within the true spirit and scope of the invention.

What is claimed is:

1. In an electrophotographic copying machine in which an original copying platen is mounted at one side of the body of the copying machine, and the platen has an exterior corner edge providing for bound document copying with the document binding placed over the platen corner, and wherein the platen is stationary during the copying of documents thereon, and wherein the copying machine has movable optical scanning means for scanning a document on the stationary platen, and wherein the scanning means has a scan starting registration position adjacent an interior side of the platen opposite from said corner of the platen, and wherein said scanning means has a platen scanning direction from said registration position towards said corner; the improvement comprising means for movable repositioning said platen, relative to said body of said copying machine toward or away from said scanning direction of said scanning means for changing said scan starting registration position of said scanning means relative to said platen in order to change the effective size of said platen scanned by said scanning means for different sizes of originals.

2. The copying machine of claim 1, wherein said exposure scanning means comprises a moving illumination lamp system.

3. The copying machine of claim 1, wherein said scanning means scans the full platen distance between said registration position and said corner of said platen, and wherein said scanning means includes means for shortening or lengthening the scanning distance of said scanning means in coordination with said repositioning of said platen.

4. The copying machine of claim 1, wherein said repositioning of said platen shortens or lengthens the distance between said corner of said platen and said registration position of said scanning means.

5. The copying machine of claim 4, wherein said scanning means maintains said scanning for at least the full distance between said registration position and said corner of said platen for any said repositioning of said platen.

6. The copying machine of claim 1, wherein said platen is an integral L-shaped unit, with a generally horizontal copying top portion and a generally vertical side portion, and said unit is integrally repositionable on said body of said copying machine.

7. The copying machine of claim 6, further including pivotable side-wall means on said body of said copying machine for automatically maintaining engagement with said side portion of said platen with said repositioning of said platen.

8. In a copying apparatus wherein documents are copied on a platen on said copying apparatus by optical scanning means in said copying apparatus for scanning said platen from a registration position, and wherein said platen is stationary at a copying position during the copying of documents thereon by said scanning means, the improvement comprising:
   means for changing said copying position of said platen on said copying apparatus relative to said registration position prior to said copying to change the area of the platen being scanned by said scanning means proportionally to the size of a document to be copied thereon.

9. The copying apparatus of claim 8, further including means for changing the distance by which said scanning means scans said platen in proportion to said change in position of said platen.

10. The copying apparatus of claim 8, wherein said registration position is fixed relative to said copying apparatus.

11. The copying apparatus of claim 10, wherein said platen has a corner book copying edge and is movable in a direction from said corner edge towards said registration position to shorten the distance therebetween for changing said copying position.

12. In a method of copying bound documents comprising bound sets of pages on a stationary copying platen having a corner edge over which the binding area of the document can be placed to copy individual pages from the bound document, and wherein the platen is scanned by the movement of optical scanning means from a registration position towards said corner edge of the platen; the improvement comprising maintaining the same registration position of the scanning means, and repositioning the platen toward or away from the registration position, prior to the movement of the scanning means, for shortening or lengthening the distance between the corner edge of the platen and the registration position.

13. The method of claim 12, wherein a bound document is placed on the platen with the binding over the corner edge and the platen is moved towards the registration position until the edge of the document page is closely adjacent the registration position, and then the scanning means is actuated with the platen and the bound document positioned stationarily.

14. The method of claim 12, wherein the scanning distance of said scanning means is shortened or lengthened in coordination with said change in position of the platen to maintain said scanning between the corner edge of the platen and the registration position.

15. The method of claim 13, wherein the scanning distance of said scanning means is shortened in coordination with said change in position of the platen to maintain said scanning between the corner edge of the platen and the registration position.

16. The method of claim 12, wherein the copy paper on which the document is copied is changed to a smaller size in proportion to said shortening of the distance between the corner edge of the platen and the registration position.

* * * * *